United States Patent Office 3,499,088
Patented Mar. 3, 1970

3,499,088
STABLE AQUEOUS SOLUTIONS OF COENZYME Q WITH A POLYOXYETHYLENE HYDROGENATED CASTOR OIL AND PROPYLENE GLYCOL AND PROCESS FOR THE MANUFACTURE THEREOF
Hiroyuki Shinkai, Mitsunori Washitake, and Toshio Anmo, Tokyo, Japan, assignors to Taisho Pharmaceutical Co., Ltd., Tokyo, Japan, a corporation of Japan
No Drawing. Filed July 8, 1966, Ser. No. 563,671
Claims priority, application Japan, July 15, 1965, 40/42,346
Int. Cl. A61k 19/02
U.S. Cl. 424—331                        10 Claims

ABSTRACT OF THE DISCLOSURE

Stable aqueous solutions containing coenzyme Q solubilized in water with a polyoxyethylene-hydrogenated castor oil and propylene glycol.

---

This invention relates to aqueous formulations containing benzoquinone derivatives. More particularly, it relates to stable aqueous solutions of benzoquinone derivatives suitable for pharmaceutical use and especially for parenteral administration and to a method of preparing the same.

It has heretofore been known that various benzoquinone derivatives, called coenzyme Q, are factors which play an important role in the biological oxidation system. However, these compounds are virtually insoluble in water and it is therfore difficult to utilize them in form of aqueous formulations.

The novel stable aqueous solution of the invention contains coenzyme Q solubilized in water with polyoxyethylene-hydrogenated castor oil and propylene glycol.

The stable aqueous solution of the invention can be prepared by solubilization of coenzyme Q by the combined use of polyoxyethylene-hydrogenated castor oil and propylene glycol.

In a preferred embodiment coenzyme Q is used in finely powdered form or dissolved in benzyl alcohol.

As coenzyme Q compound any representative of this class of compounds may be used. The process of the present invention is, however, especially suitable for the preparation of stable aqueous suspensions of coenzyme $Q_4$ to coenzyme $Q_{10}$, in particular of coenzyme $Q_9$ and $Q_{10}$.

Preferred polyoxyethylene-hydrogenated castor oils used in the process of the invention contain 40 to 50 moles of ethylene oxide per mole of hydrogenated castor oil. Suitable products are commercially available e.g. under the designation Atlas G 1292 or from Nikko Shokai under the designation Nikkol HCO–40 or Nikkol HCO–50.

In a preferred embodiment of the invention one part by weight of coenzyme Q is solubilized by the addition of less than 5 parts by weight of polyoxyethylene-hydrogenated castor oil. It is advantageous to use 1 to 5 parts, most suitably about 4 parts by weight of polyoxyethylene-hydrogenated castor oil per part by weight of coenzyme Q. The propylene glycol is also added in minor amounts, for example about 1 to 5 parts by weight of propylene glycol per part by weight of coenzyme Q.

If polyoxyethylene-hydrogeated castor oils are used which contain substantially more than 50 moles of ethylene oxide per mole of hydrogenated castor oil (for instance 80 moles of ethylene oxide per mole of hydrogenated castor oil) it is preferable to add a solvent, such as benzyl alcohol, to the mixture in order to produce a stable solution.

It has surprisingly been found that the solutions prepared according to this invention are very stable. A solution which was kept for 30 days at 40° C. still showed the original coenzyme Q content. During this time no discoloration or precipitation could be observed.

EXAMPLE 1

10 mg. of coenzyme $Q_9$, 40 mg. of polyoxyethylene-hydrogenated castor oil (Nikkol HCO–40; 40 moles of ethylene oxide per mole of hydrogenated castor oil) and 40 mg. of propylene glycol are mixed and by gradual addition of distilled water brought to a volume of 1 ml. The solution is warmed on a water bath for 15 minutes and filled into an amber-coloured glass ampule.

EXAMPLE 2

10 mg. of coenzyme $Q_9$ dissolved in 10 mg. of benzyl alcohol, 45 mg. of polyoxyethylene-hydrogenated castor oil (Nikkol HCO–50, 50 moles of ethylene oxide per mole of hydrogenated castor oil) and 30 mg. of propylene glycol are mixed and the volume brought to 1 ml. by gradual addition of distilled water. The aqueous solution is warmed on a water bath for 10 minutes and filled into an amber-coloured glass ampule.

EXAMPLE 3

10 mg. of coenzyme $Q_9$ are dissolved in 10 mg. of benzyl alcohol and added with 35 mg. of polyoxyethylene-hydrogenated castor oil (Nikkol HC–40) and 40 mg. of propylene glycol. The resulting mixture is brought to a total volume of 1 ml. by gradual addition of distilled water. The aqueous solution so obtained is warmed on a water bath for 10 minutes and filled into an amber-coloured glass ampule.

The same results are obtained when in Examples 1–3 coenzyme $Q_9$ is replaced by coenzyme $Q_{10}$.

Having now particularly described and ascertained the nature of our said invention and in what manner the same is to be performed, we declare that what we claim is:

1. A stable aqueous solution containing coenzyme Q solubilized in water with from about 1 to 5 parts of polyoxyethylene-hydrogenated castor oil containing from about 40 to 80 moles of ethylene oxide per mol of hydrogenated castor oil, and from 1 to 5 parts of propylene glycol, said parts being by weight per part by weight of the coenzyme Q.

2. A stable aqueous solution according to claim 1, wherein the polyoxyethylene-hydrogenated castor oil contains 40 to 50 moles of ethylene oxide per mole of hydrogenated castor oil.

3. A stable aqueous solution according to claim 2, wherein about 4 parts by weight of polyoxyethylene-hydrogenated castor oil are present per part by weight of coenzyme Q.

4. A stable aqueous solution according to claim 1, wherein as coenzyme Q a member of the group consisting of coenzyme $Q_4$, $Q_5$, $Q_6$, $Q_7$, $Q_8$, $Q_9$ and $Q_{10}$ is present.

5. A stable aqueous solution according to claim 4, wherein coenzyme $Q_9$ or $Q_{10}$ is present.

6. A process for the manufacture of a stable aqueous solution which comprises solubilizing coenzyme Q by the combined use of from about 1 to 5 parts of polyoxyethylene-hydrogenated castor oil and propylene glycol, said polyoxyethylene-hydrogenated castor oil containing from about 40 to 80 moles of ethylene oxide per mole of hydrogenated castor oil, and from about 1 to 5 parts of propylene glycol, said parts being by weight per part by weight of the coenzyme Q.

7. A process according to claim 6, wherein the coenzyme Q to be solubilized is used in finely powdered form or dissolved in benzyl alcohol.

8. A process according to claim 7, wherein the polyoxyethylene-hydrogenated castor oil contains 40–50 moles of ethylene oxide per mole of hydrogenated castor oil.

9. A process according to claim 6, wherein about 4 parts by weight of the polyoxyethylene-hydrogenated castor oil are used per part by weight of coenzyme Q.

10. A process according to claim 6, wherein as coenzyme Q a member of the group consisting of coenzyme $Q_4$, $Q_5$, $Q_6$, $Q_7$, $Q_8$, $Q_9$, and $Q_{10}$ is present.

References Cited

Chem. Abstracts (I) 63 pp. 979–980 (1965).
Chem. Abstracts (II) 58, 859D (1963).
Chem. Abstracts (IV) 58, 5460D (1963).
Chem. Abstracts 58, Subject Index A–F p. 4855 (1963).
Merck Index 7th Ed. 1960, p. 863.
Vitamins and Coenzymes—Wagner (1964) p. 437.
Vitamines and Hormones, vol. 18, 1960, pp. 486–487.

ALBERT T. MEYERS, Primary Examiner

J. J. FRIEDMAN, Assistant Examiner